United States Patent [19]

Fries

[11] Patent Number: 4,482,638

[45] Date of Patent: Nov. 13, 1984

[54] IN SITU PROCESS FOR PRODUCING AN ALPHA OLEFIN POLYMERIZATION CATALYST COMPONENT

[75] Inventor: Richard W. Fries, Joliet, Ill.

[73] Assignee: Northern Petrochemical Company, Omaha, Nebr.

[21] Appl. No.: 513,766

[22] Filed: Jul. 14, 1983

[51] Int. Cl.$^3$ .............................................. C08F 4/64
[52] U.S. Cl. .................................. 502/108; 502/109; 502/125; 502/126; 502/127
[58] Field of Search ................................. 502/108, 109

[56] References Cited

U.S. PATENT DOCUMENTS

| | | | |
|---|---|---|---|
| 3,317,498 | 5/1967 | Harban et al. | 526/351 X |
| 3,318,861 | 5/1967 | Adema et al. | 526/348.6 X |
| 3,582,987 | 6/1971 | Natta et al. | 260/93.5 |
| 4,228,263 | 10/1980 | Howard et al. | 526/348 X |
| 4,235,747 | 11/1980 | Leung | 502/107 |
| 4,295,991 | 10/1981 | Wristers | 502/108 X |
| 4,324,693 | 4/1982 | Arzoumanidis et al. | 502/108 |
| 4,342,856 | 8/1982 | Patniak | 502/169 X |
| 4,351,930 | 9/1982 | Patniak | 526/348.6 X |
| 4,363,901 | 12/1982 | Kikuta et al. | 502/154 X |

FOREIGN PATENT DOCUMENTS 11914  6/1980  European Pat. Off. .

Primary Examiner—Patrick Garvin
Attorney, Agent, or Firm—Donald F. Haas

[57] ABSTRACT

A process is disclosed for producing, in situ and without milling or grinding, an alpha olefin polymerization catalyst component which comprises adding an olefin to a titanium halide and then adding an electron donor to the mixture of the titanium halide and the olefin.

10 Claims, No Drawings

IN SITU PROCESS FOR PRODUCING AN ALPHA OLEFIN POLYMERIZATION CATALYST COMPONENT

BACKGROUND OF THE INVENTION

The present invention relates to a process for producing a catalyst component which can be used for the polymerization of alpha olefins. More particularly, the present invention relates to such a process which is performed in situ and does not require milling or grinding of the catalyst component.

The prior art is replete with references which disclose the improvement of the activity of alpha olefin polymerization catalysts by the addition of electron donors to the catalysts. Almost invariably, these references teach that in order to obtain high activity by the use of an electron donor, the catalyst component and electron donor must be milled or ground together to obtain intimate contact therebetween. Examples of such references are U.S. Pat. Nos. 4,120,823, 4,154,699 and 4,154,700.

There are also a number of references which teach the advantage of treating a polymerization catalyst component with an olefin to improve the activity of the catalyst. Defensive Publication T951,009 discloses the treatment of a transition metal-Lewis base catalyst component with propylene to improve its activity. The components are ground together in a ball mill before they are contacted with the propylene. U.S. Pat. No. 3,404,096 discloses a process for improving a titanium trichloride catalyst by pretreating it in an inert diluent with an olefin. There is no mention of the subsequent addition in situ of an electron donor.

It is an object of the present invention to produce an alpha olefin polymerization catalyst component in an in situ process which does not require expensive and time consuming milling or grinding to achieve intimate contact between a titanium halide and an electron donor but which achieves a level of performance which is substantially equivalent to such catalyst components which are produced with such a milling or grinding step.

SUMMARY OF THE INVENTION

The present invention relates to a process for producing an alpha olefin polymerization catalyst component in an in situ process which does not require expensive and time consuming milling or grinding of the catalyst component. The process comprises adding an olefin to a titanium halide and then adding an electron donor to the mixture of the olefin and titanium halide.

DETAILED DESCRIPTION OF THE INVENTION

The polymerization catalyst component can be used in virtually all relevant conventional technological embodiments, i.e. as in a batchwise, cyclic or continuous process, which may, for example, be a suspension polymerization process, solution polymerization process, or gas phase polymerization process. The technological embodiments mentioned are well known from the literature and from industrial practice and do not require more detailed comments.

The titanium halide employed can be a titanium halide, for example, a reaction product obtained on reducing a titanium tetrahalide with hydrogen, aluminum or an aluminum-organic compounds. Compounds which have proved very suitable are, for example, the trichlorides of the formula $TiCl_3$, as obtained by reducing titanium tetrachloride with hydrogen, and especially co-crystals, as obtained by co-crystallizing titanium trichloride and aluminum trichloride or reducing titanium tetrachloride with aluminum or with mixtures of aluminum and titanium. Co-crystals of the formula $TiCl_3 \cdot \frac{1}{3}AlCl_3$ are particularly suitable. The appropriate titanium halides are commercially available and hence do not require further comment.

Electron donors which are useful in the process of the present invention are organic compounds which can contain a carbonyl group and which do not contain other reactive groups which would interfere with the activity of the catalyst such as those with active hydrogens including alcohols and phenols. Examples of such compounds are halogenated and unhalogenated aliphatic and aromatic esters, ethers, ketones. The preferred electron donors for use in the present invention are aromatic esters.

The most highly preferred electron donors for use in the present invention are benzoic acid esters having the formula

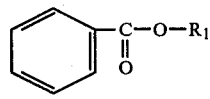

where $R^1$ is alkyl, preferably $C_1$–$C_8$, or aromatic, preferably ethyl, butyl, or benzyl. Typical examples of very suitable esters are ethyl, butyl, and benzyl benzoate, especially butyl benzoate.

When used in a polymerization process, the catalyst component described above is activated with a suitable aluminum alkyl of the formula

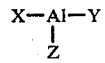

where X and Y are each alkyl of not more than 8, especially not more than 2, carbon atoms, and Z is halogen or alkyl of not more than 8, especially no more than 2, carbon atoms. These are so well known from the literature and from industrial practice that they do not require more detailed discussions here. Particularly important examples are triethylaluminum and diethylaluminum chloride.

The process of the present invention simply comprises adding an olefin in situ to a titanium halide as described above, then adding one of the electron donors described above in situ to this mixture, and then decanting or washing away the unreacted olefin so it does not interfere with the polymerization. The milling or grinding which heretofore has been considered necessary to establish intimate contact between the titanium halide and the electron donor is specifically excluded from the process of this invention. The catalyst component produced according to this invention has a productivity substantially equivalent to catalyst components with a similar composition which are produced by milling or grinding and is capable of producing polymers with a similar level of heptane insolubles, i.e. crystallinity.

A wide variety of olefins can be used to advantage in the process of the present invention. Specific olefins which have utility are ethylene, propylene, 1-butene, 1-pentene, 4-methyl-1-pentene, 1-hexene, 1-heptene, 1-octene, cyclohexene, 3,3-dimethylbutene, dodecene, and tetradecene. Particularly preferred olefins for use in this invention are propylene, 4-methyl-1-pentene, 1-hexene, dodecene, and tetradecene because of relatively low cost, ease of purification, and availability.

The olefin may be added to the titanium halide in a variety of ways. One way is to place the titanium halide in an inert solvent such as heptane and then introduce the olefin to this mixture. In the case of an olefin which is a gas, such as propylene, it can be bubbled through the mixture for a period of time. A liquid olefin, such as 4-methyl-1-pentene, can simply be added to and dissolved by the inert solvent. Also, if the olefin is a liquid, it can be added directly to the titanium halide without the necessity of a solvent. When the olefin and the titanium halide are placed in contact, a reaction takes place wherein heat is evolved and the reaction mixture becomes viscous and turbid. The result of this reaction is that a cationic polymerization of the olefin occurs to form oligomers.

The electron donor is added directly to the mixture of the titanium halide and the olefin. This can be accomplished by adding the electron donor to the solution described above after the olefin and the titanium halide have had a chance to react. Another possible method is to remove the olefin-treated titanium halide from the solvent, wash it, if necessary, to remove excess olefin, and then add the electron donor either directly or in solution with an inert solvent. It is preferred rather that the unreacted olefin is washed away so it does not interfere with the polymerization, then the electron donor is added, and, finally, the electron donor is washed away because one can then dry the catalyst for storage, analysis or addition to the polymerization reactor.

The present process of first adding an olefin to a titanium halide and then adding an electron donor produces a catalyst component which is characterized by a higher productivity than catalyst components consisting of the titanium halide alone, the titanium halide treated only with the olefin, the titanium halide treated only with the electron donor, and the titanium halide treated with the electron donor first. It is theorized that the reason why the present process is superior because the treatment first creates new active sites on the catalyst and then the electron donor modifies these sites for isotactic polymerization.

EXAMPLE I

The following experiments were performed with a variety of catalyst components prepared as described below. Each of the catalyst components was used to polymerize propylene with diethylaluminum chloride as the co-catalyst in a gas-phase process at 75° to 80° C. and 7 atmospheres pressure for one hour. The aluminum to titanium mole ratio in all cases was 7:1. The results of these experiments are recorded in Table 1.

In experiment 1, co-crystallized titanium trichloride and aluminum trichloride was used without treatment with an olefin or an electron donor. In experiment 2, 0.3 grams of a co-crystallized titanium trichloride was placed under an inert atmosphere of nitrogen and was treated with 1-2 milliliters of one molar butyl benzoate in heptane. The mixture was allowed to react for 10 hours and the excess butyl benzoate was removed by centrifugation. In the third experiment, 1-2 milliliters of 4-methyl-1-pentene was added to 0.3 grams of co-crystallized titanium trichloride. The mixture was allowed to react for 30 minutes and then the solid catalyst was washed 3 times with heptane.

In experiments 4-11, two milliliters of an olefin as indicated in the table was added to 0.3 grams of a co-crystallized titanium trichloride and the mixture was allowed to react for 30 minutes. The olefin was removed by centrifugation and the pellet washed 3 times with heptane. The pellet was then treated with one milliliter of one molar butyl benzoate and allowed to react for 30 minutes. The butyl benzoate was then removed by centrifugation and the pellet used to polymerize propylene. In experiments 12 and 13, this procedure was repeated except that the butyl benzoate was added before the addition of the olefin.

In experiment 14, 5.1 grams of a co-crystallized titanium trichloride was placed in 100 milliliters of heptane. The slurry was cooled to −78° C. in a dry ice bath. A mixture of nitrogen and propylene was bubbled through the slurry for 5 minutes and then propylene alone was bubbled through the slurry for 30 minutes. The contents were then treated with 15 milliliters of one molar butyl benzoate in heptane and stirred for 20 minutes at −78° C. The propylene was then replaced with nitrogen and the slurry was slowly warmed to ambient temperature. Finally, the catalyst component was washed 5 times with 100 milliliters of heptane and dried under a gentle stream of nitrogen.

In experiment 15, 40 milliliters of a mixture of dodecene and tetradecene was added under nitrogen to 6.0 grams of a co-crystallize titanium trichloride. The slurry was stirred for 30 minutes and then 20 milliliters of a one molar butyl benzoate solution in heptane was added. The mixture was allowed to stand overnight and then the ester olefin solution was removed. Finally, the catalyst component was washed 6 times with 50 milliliters of heptane and dried under nitrogen.

In experiment 16, the catalyst was prepared by ball milling $TiCl_3.AA$ and butyl benzoate together at a 3.8:1 mole ratio. The catalyst was used to polymerize propylene in the gas phase with diethyl aluminum chloride at a 7:1 Al:Ti ratio.

TABLE 1

| Experiment | Catalyst Component | Productivity Gms. PP Gm. Cat. hr. Atmosphere | % Change In Productivity | % Heptane Insoluble |
|---|---|---|---|---|
| 1 | $TiCl_3.AA$ | 15.9 | — | 92.6 |
| 2 | $TiCl_3.AA$ and butyl benzoate | 11.8 | −26% | 95.9 |
| 3 | $TiCl_3.AA$ and 4-methyl-1-pentene | 27.1 | +70% | 92.7 |
| 4 | $TiCl_3.AA$ and 4-methyl-1-pentene then butyl benzoate | 34.2 | +116% | 94.3 |
| 5 | $TiCl_3.AA$ then 3,3-dimethylbutene | 24.9 | +57% | 92.4 |
| 6 | | 29.0 | +82% | 90.8 |
| | then butyl benzoate | | | |
| 7 | $TiCl_3.AA$ then 3,3-dimethylbutene then butyl benzoate | 33.3 | +109% | 91.7 |
| 8 | $TiCl_3.AA$ then dodecene, tetradecene | 34.4 | +116% | 95.3 |
| 9 | then butyl benzoate | 30.5 | +92% | 93.0 |
| 10 | $TiCl_3.AA$ then dodecene, tetradecene then ethyl acetate | 24.9 | +57% | 94.1 |
| 11 | $TiCl_3.AA$ then dodecene, tetradecene then methyl para toluate | 26.6 | +69% | 93.1 |
| 12 | $TiCl_3.AA$ then butyl | 17.3 | +8% | NA |

TABLE 1-continued

| Experiment | Catalyst Component | Productivity Gms. PP Gm. Cat. hr. Atmosphere | % Change In Productivity | % Heptane Insoluble |
|---|---|---|---|---|
| | benzoate then 3,3-dimethylbutene | | | |
| 13 | TiCl$_3$.AA then butyl benzoate then dodecene, tetradecene | 19.0 | +19% | 94.4 |
| 14 | TiCl$_3$.AA then propylene then butyl benzoate | 35.7 | +129% | 95.8 |
| 15 | TiCl$_3$.AA then dodecene, tetradecene then butyl benzoate | 26.0<br>27.1 | +64%<br>+70% | 96.5<br>94.6 |
| 16 | TiCl$_3$ and butyl benzoate ball milled | 22.8 | +43% | 95.6 |

A comparison of experiments 1 and 2 shows that adding an electron donor to the titanium component without first treating it with an olefin actually decreases the productivity of the catalyst component. Comparing the catalyst component of experiment 3 with the control of experiment 1, it is seen that there is a large increase in catalyst activity but experiment 4 shows that if the process of the present invention is utilized, there is a much larger increase in the catalyst productivity than when the titanium halide is treated with the olefin alone.

Experiments 5–11 and 14 and 15, which were all performed according to the process of the present invention, indicate dramatic increases in the productivity of the catalyst as compared to the control in experiment 1. Experiments 12 and 13, which were performed in reverse order, show only a very small improvement catalyst productivity. In general, the crystallinity of the polypropylene produced with the catalyst components made by the process of the present invention, as measured by percent heptane insolubles, is increased as compared to the control catalyst component although it stayed the same or slightly decreased in a few cases.

A comparison of experiments 4–11, 14 and 15 with experiment 16 indicates that the process of the present invention produces a catalyst with better productivity than catalysts produced by the traditional ball milling method.

I claim:

1. A process for producing, in situ and without milling or grinding, an alpha olefin polymerization catalyst component which consists of:
    (a) Adding an olefin to a titanium halide, and
    (b) Adding an electron donor to the mixture of (a).
2. The process of claim 1 wherein the olefin is selected from the group consisting of ethylene, propylene, 1-butene, 1-pentene, 4-methyl-1-pentene, 1-hexene, 1-heptene, 1-octene, cyclohexene, 3,3-dimethylbutene, dodecene, and tetradecene and the electron donor is an aromatic ester.
3. The process of claim 1 wherein the titanium halide is placed in an inert solvent and the olefin is added to the solution.
4. The process of claim 3 wherein the solution containing unreacted olefin is removed from the titanium halide before the electron donor is added thereto.
5. The process of claim 1 wherein the olefin is added to the titanium halide in liquid form.
6. The process of claim 5 wherein unreacted olefin is removed from the titanium halide before the electron donor is added
7. The process of claim 2 wherein the olefin is selected from the group consisting of propylene, 4-methyl-1-pentene, 1-hexene, dodecene, and tetradecene and the electron donor is a benzoic acid ester having the formula

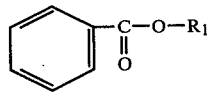

where R$^1$ is alkyl or aromatic.

8. The process of claim 7 wherein R$^1$ is C$_1$-C$_8$.
9. The process of claim 8 wherein R$^1$ is ethyl, butyl, or benzyl.
10. The process of claim 7 wherein the electron donor is butyl benzoate.

* * * * *